US012775987B2

(12) United States Patent
Yang

(10) Patent No.: US 12,775,987 B2

(45) Date of Patent: Oct. 27, 2026

(54) DATA PROCESSING METHOD, COMPUTER DEVICE AND STORAGE MEDIUM

(71) Applicant: BEIJING VOLCANO ENGINE TECHNOLOGY CO., LTD., Beijing (CN)

(72) Inventor: Xinying Yang, Beijing (CN)

(73) Assignee: BEIJING VOLCANO ENGINE TECHNOLOGY CO., LTD., Beijing (CN)

( * ) Notice: Subject to any disclaimer, the term of this patent is extended or adjusted under 35 U.S.C. 154(b) by 186 days.

(21) Appl. No.: 18/518,678

(22) Filed: Nov. 24, 2023

(65) Prior Publication Data

US 2024/0177245 A1 May 30, 2024

(30) Foreign Application Priority Data

Nov. 24, 2022 (CN) ........................ 202211482997.X

(51) Int. Cl.
*G06Q 40/12* (2023.01)

(52) U.S. Cl.
CPC .................................... *G06Q 40/12* (2013.12)

(58) Field of Classification Search
CPC ...... G06Q 40/12; G06Q 20/389; Y02D 10/00; G06F 2221/2101; G06F 16/219; G06F 16/2358; G06F 21/64; H04L 9/50
See application file for complete search history.

(56) References Cited

FOREIGN PATENT DOCUMENTS

| | | | |
|---|---|---|---|
| CN | 111858658 | A | 10/2020 |
| CN | 114372296 | A | 4/2022 |
| CN | 114564757 | A | 5/2022 |
| CN | 115271717 | A | 11/2022 |
| EP | 3851993 | A1 | 7/2021 |
| WO | 2020199713 | A1 | 10/2020 |

OTHER PUBLICATIONS

By Antonopoulos, et al., SQL Ledger: Cryptographically Verifiable Data in Azure SQL Database, SIGMOD 2021, received via IDS (Year: 2021).*

Extended EP Search Report dated Feb. 6, 2024 in EP Appl. No. 23211328.2 (7 pages).

Antonopoulos Panagiotis Panant@Microsoft Com et al: "SOL Ledger: Cryptographically Verifiable Data in Azure SOL Database", Proceedings of the 2021 International Conference on Management of Data, ACMPUB27, New York, NY, USA, Jun. 9, 2021 (Jun. 9, 2021), pp. 2437-2449.

Big Data, Issue 01, Jan. 15, 2018, Qian Weining; Jin Cheqing; Shao Qifeng; Zhou Quanwen Aoying; Blockchain and Sharing Data database.

First Office Action for Chinese Application No. 202211482997.X, mailed Oct. 30, 2024, 9 pages.

* cited by examiner

*Primary Examiner* — Tyler J Torgrimson

(57) ABSTRACT

The present disclosure provides a data processing method, a computer device and a storage medium, wherein the method includes: acquiring target activity data and operation data after a target transaction operation being performed on individual target activity data; storing first activity data in a current record table, and storing second activity data in a history record table; generating, based on preset fields in a full audit data table, first audit data of the individual target activity data in individual fields and second audit data of individual operation data in the individual fields; and storing the first audit data and the second audit data in the full audit data table.

14 Claims, 3 Drawing Sheets

DATA PROCESSING METHOD, COMPUTER DEVICE AND STORAGE MEDIUM

CROSS REFERENCE TO RELATED APPLICATION

This application claims priority from Chinese Patent Application No. 202211482997. X, filed on Nov. 24, 2022, the contents of which are hereby incorporated by reference in their entirety for all purposes.

TECHNICAL FIELD

The present disclosure relates to a technical field of data processing, and more specifically, to a data processing method, a computer device and a storage medium.

BACKGROUND

In the era of rapid development of Internet technology, a large number of user activity data are generated as a result of a user interacting with a server. A blockchain has functions such as anti-tampering and non-repudiation, and the user activity data can usually be stored in the blockchain as transaction records, so as to generate an audit ledger in the blockchain. Auditing the audit ledger in the blockchain makes it more convenient to confirm attribution of responsibility, trace user data, and verify legitimate operations, and so on.

However, the audit ledger in the blockchain usually cannot realize a full audit, and cannot realize a reading-writing separation and a reading-writing-verifying separation, and the audit efficiency is low.

SUMMARY

Embodiments of the present disclosure provide at least a data processing method, a data processing apparatus, a computer device, and a storage medium.

In a first aspect, an embodiment of the present disclosure provides a data processing method comprising:

- acquiring target activity data and operation data after a target transaction operation being performed on individual target activity data, the target activity data comprising first activity data in a first preset time period and second activity data in a second preset time period, the first preset time period being a time period closest to a current time, and the second preset time period being a time period prior to the first preset time period;
- storing the first activity data in a current record table, and storing the second activity data in a history record table;
- generating, based on preset fields in a full audit data table, first audit data of the individual target activity data in individual fields and second audit data of individual operation data in the individual fields; and
- storing the first audit data and the second audit data in the individual fields in the full audit data table, the full audit data table being used in performing an audit.

In an optional implementation, the fields include a sequence identification field.

The generating the first audit data of the individual target activity data in the fields comprises:

- generating, based on an order in which the individual target activity data are arranged, sequence identification information of the individual target activity data in the sequence identification field in a monotonically increasing manner.

In an optional implementation, after generating the sequence identification information of the individual target activity data in the sequence identification field, the method further comprises:

- for the individual target activity data, storing the sequence identification information corresponding to the target activity data in a record table in which the target activity data reside.

In an optional implementation, the fields comprise a transaction type field, and a transaction type is used to characterize a type of the target transaction operation performed on the individual target activity data.

In an optional implementation, the fields further comprise a digest field; the generated first audit data comprise digest information in the transaction type field which is data writing.

The generating the first audit data of the individual target activity data in the individual fields comprises:

- for the individual target activity data, generating, based on data contents of the target activity data, digest information of the target activity data in the digest field.

In an optional implementation, after generating the digest information of the individual target activity data in the digest field, the method further comprises:

- generating, based on the digest information and a preset verification rule, verification information corresponding to the digest information;
- generating a target digest based on the digest information, the verification information corresponding to the digest information, and client signature information; and
- signing the target digest and returning the signed target digest to a client which sends the target activity data.

In an optional embodiment, the fields further comprise a digest field and a related sequence identification field; the generated second audit data comprise digest information in the transaction type field which is another transaction type field other than the data writing.

The generating the second audit data of the individual operation data in the individual fields comprises:

- for the individual operation data, treating sequence identification information of the target activity data corresponding to the operation data as related sequence identification information of the operation data in the related sequence identification field; and
- hashing transaction type information of the operation data in the transaction type field and the related sequence identification information, to obtain the digest information of the operation data in the digest field.

In an optional embodiment, the transaction type comprises data hiding; the generated first audit data of the individual target activity data in the transaction type field comprise data writing.

The generating the second audit data of the individual operation data in the individual fields comprises:

- updating the data writing of the operation data corresponding to the target activity data in the transaction type field to data-be-hidden.

In a second aspect, an embodiment of the present disclosure further provides a data processing apparatus comprising:

- an acquisition module for acquiring target activity data and operation data after a target transaction operation being performed on individual target activity data, the target activity data comprising first activity data in a first preset time period and second activity data in a second preset time period, the first preset time period being a time period closest to a current time, and the second preset time period being a time period prior to the first preset time period;

a first storage module for storing the first activity data in a current record table, and storing the second activity data in a history record table;

a first generation module for generating, based on preset fields in a full audit data table, first audit data of the individual target activity data in individual fields and second audit data of individual operation data in the individual fields; and a second storage module for storing the first audit data and the second audit data in the individual fields in the full audit data table, the full audit data table being used in performing an audit.

In a third aspect, an embodiment of the present disclosure further provides a computer device comprising a processor, a memory and a bus, the memory having machine-readable instructions executable by the processor stored thereon, and the processor communicating with the memory via the bus when the computer device is in operation, and the steps in the first aspect or any possible implementation of the first aspect described above being performed when the machine-readable instructions are executed by the processor.

In a fourth aspect, an embodiment of the present disclosure further provides a computer-readable storage medium having a computer program stored thereon, the steps in the first aspect or any possible implementation of the first aspect described above being performed when the computer program is executed by a processor.

In order to make the objects, features and advantages of the present disclosure more apparent and understandable, preferred embodiments are given and described below in detail in conjunction with the accompanying drawings.

BRIEF DESCRIPTION OF THE DRAWINGS

In order to illustrate technical solutions of embodiments of the present disclosure more clearly, the drawings required to be used in the embodiments will be briefly introduced below. The drawings herein are incorporated into the description and constitute a part of the description. The drawings illustrate embodiments in conformity with the present disclosure and, together with the description, are used to illustrate the technical solutions of the present disclosure. It should be understood that the following drawings only illustrate some embodiments of the present disclosure, and therefore should not be regarded as limitations to the scope. Those of ordinary skill in the art can further obtain other relevant drawings according to these drawings, without exerting creative efforts.

DETAILED DESCRIPTION

Figure 1:
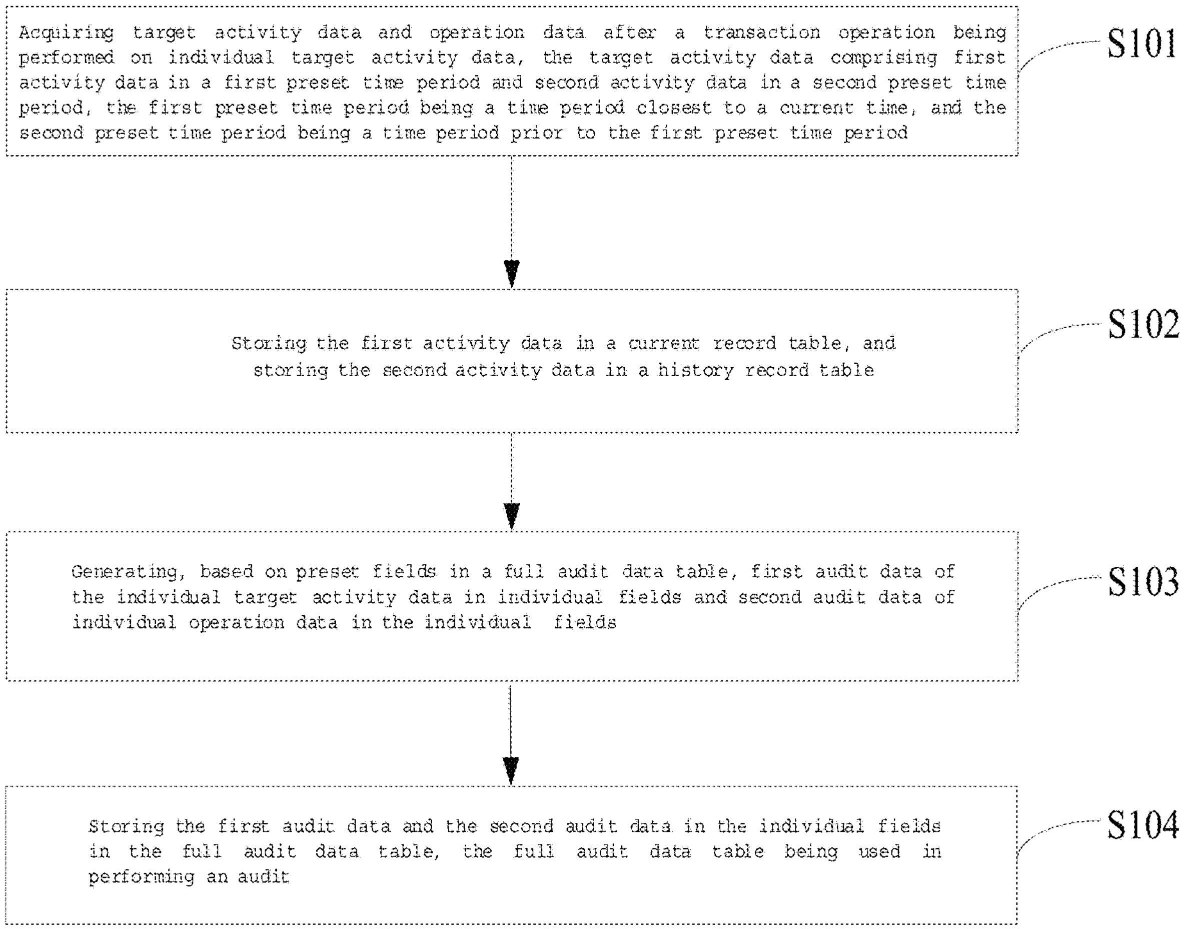
FIG. 1 illustrates a flowchart of a data processing method provided by an embodiment of the present disclosure.

In order to make objects, technical solutions and advantages of the embodiments of the present disclosure clearer, the technical solutions in the embodiments of the present disclosure will be clearly and completely described below in conjunction with the accompanying drawings in the embodiments of the present disclosure. Obviously, the described embodiments are only a part of the embodiments of the present disclosure, not all of the embodiments. Components of the embodiments of the present disclosure described and illustrated in the accompanying drawings herein may generally be arranged and designed in a variety of different configurations. Therefore, the following detailed description of the embodiments of the present disclosure provided in the accompanying drawings is not intended to limit the claimed scope of the present disclosure, but rather to represent selected embodiments of the present disclosure. Based on the embodiments of the present disclosure, all other embodiments obtained by those skilled in the art without any creative efforts shall fall within the protection scope of the present disclosure.

In the era of rapid development of Internet technology, a large number of user activity data are generated as a result of a user interacting with a server. A blockchain has functions such as anti-tampering and non-repudiation, and the user activity data can usually be stored in the blockchain as transaction records, so as to generate an audit ledger in the blockchain. Auditing the audit ledger in the blockchain makes it more convenient to confirm attribution of responsibility, trace user data, and verify legitimate operations, and so on.

In the original blockchain data table (Oracle Blockchain Table) and the Structured Query Language (SQL) general audit ledger on the Microsoft SQL server side, there is no distinction between the current record table and the history record table, and the relevant audit data in the general audit ledger is directly stored in the original data table in a form of an implicit column, which cannot realize a reading-writing separation and a reading-writing-verifying separation, and makes the audit efficiency low. Moreover, operation data for data purging are not recorded in the original blockchain data table, i.e., the original blockchain data table is not full audit data, and it is impossible to realize a full audit.

In the databases Proven DB and Ledger DB, although they have a full audit ledger, the stored data do not support structured storage and transaction, and it is not possible to realize a reading-writing separation, and a reading-writing-verifying separation, resulting in low audit efficiency.

Based on this, the present disclosure provides a data processing method comprising: acquiring target activity data and operation data after a target transaction operation being performed on individual target activity data, the target activity data comprising first activity data in a first preset time period and second activity data in a second preset time period; storing the first activity data in a current record table, and storing the second activity data in a history record table; generating, based on preset fields in a full audit data table, first audit data of the individual target activity data in individual fields and second audit data of individual operation data in the individual fields; and storing the first audit data and the second audit data in the individual fields in the full audit data table.

In the above embodiment, with the first activity data in the first preset time period being stored in the current record table, when performing a read operation on the current record table, the operation on the history record table and the verification process for the full audit record table cannot be affected; and with the second activity data in the second preset time period being stored in the history record table, when performing a data purging operation on the history record table, the read/write operation on the current record table and the verification process for the full audit record table cannot be affected. With the first audit data and the second audit data being stored in the full audit data table, it can be ensured that the data in the full audit data table are full, and thus the completeness and correctness of the audit can be ensured. In addition, with the current record table, the history record table, and the full audit data table being generated, the embodiment of the present disclosure realizes a reading-writing separation and a reading-writing-verifying separation for data in different time periods, and thus the audit efficiency can be improved.

The defects existing in the above schemes and the solutions proposed therefor are results of the inventor's practice and careful study, and therefore, the discovery process for the above problems and the solutions proposed hereinafter in the present disclosure for the above problems shall be the inventor's contributions to the present disclosure in the course of the disclosure.

It should be noted that, similar reference numerals and letters represent similar items in the following accompanying drawings. Therefore, once an item is defined in one figure, further definition and explanation of the item are not required in the subsequent figures.

It is understood that before the technical solutions disclosed in individual embodiments of the present disclosure are used, the type, scope of usage, usage scenes, etc., of personal information involved in the present disclosure should be informed to the user and obtain the user's authorization in an appropriate manner in accordance with relevant laws and regulations.

In order to facilitate understanding of the present embodiment, firstly a data processing method disclosed in an embodiment of the present disclosure is introduced in detail, and a subject performing the data processing method provided in the embodiment of the present disclosure is generally a computer device with a certain computational capability.

Referring to FIG. 1, a flowchart of a data processing method provided by an embodiment of the present disclosure is shown, and the method includes S101~S104.

At S101, target activity data and operation data after a target transaction operation being performed on individual target activity data are acquired, and the target activity data include first activity data in a first preset time period and second activity data in a second preset time period, the first preset time period is a time period closest to the current time period, and the second preset time period is a time period prior to the first preset time period.

It is to be noted that the acquisition and usage of the target activity data herein are authorized by the user. The manner of acquiring and using the personal information may be found in the relevant description in the specific implementations of the present disclosure.

The data processing method provided by the embodiment of the present disclosure is applied in a scenario in which target activity data is stored in an blockchain in a way of an audit ledger and the audit ledger in the blockchain is audited.

Here, the target activity data may, for example, include system activity data, or user activity data, etc., which may not be specifically limited here. Here, the individual target activity data may be acquired from a client. The target transaction operation may include an operation such as writing data, purging data, hiding data, and the like. Here, target activity data in different time periods may be acquired, and specifically may include first activity data in a current first time period and second activity data in a second preset time period.

The operation data generated after the target transaction operation be performed on the target activity data may, for example, include information such as operation content, operation object, operation time, and the like.

At S102, the first activity data is stored in a current record table, and the second activity data is stored in a history record table.

Here, the current record table (Current Table, which may also be referred to as Table) may include field information of explicit columns and field information of an implicit column. The data contents of the first activity data may be recorded in the current record table, and the data contents of the first activity data are stored in the explicit columns. The implicit column in the current record table may store sequence identification information, e.g., Journal Sequence Number (JSN), of the first activity data in the full audit data table (Ledger Table). The table structure of the full audit data table and the process of generating the sequence identification information will be described in detail later.

The table structure of the current record table is shown in Table 1.

TABLE 1

| Explicit Columns | | | Implicit Column |
|---|---|---|---|
| C1 | C2 | C3 | JSN |
| 123 | 456 | 4654 | 00000008 |

In Table 1, the current record table includes explicit column fields and an implicit column field. The explicit column fields include three column fields, namely, a C1 field, a C2 field, and a C3 field. Corresponding data contents are stored in the C1 field, the C2 field, and the C3 field, respectively. The implicit column field includes a JSN field, and the sequence identification information 00000008 is stored in the JSN field.

The table structure of the history record table (History Table, which may also be referred to as Payload Table) may be the same as the table structure of the current record table. Here, the history record table may also include field information of the explicit columns and field information of an implicit column. The data contents of the second activity data may be recorded in the history record table, and the data contents of the second activity data are stored in the explicit columns. The implicit column in the history record table may store the sequence identification information, e.g., JSN, of the second activity data in the full audit data table (Ledger Table). The table structure of the current record table is shown in Table 2.

TABLE 2

| Explicit Columns | | | Implicit Column |
|---|---|---|---|
| C1 | C2 | C3 | JSN |
| 68 | 768 | 164 | 00000001 |

In Table 2, the history record table includes explicit column fields and an implicit column field. The explicit column fields include three column fields, namely, a C1 field, a C2 field, and a C3 field. Corresponding data contents are stored in the C1 field, the C2 field, and the C3 field, respectively. The implicit column field includes a JSN field, and the sequence identification information 00000001 is stored in the JSN field.

It should be noted that the data contents and the sequence identification information in Tables 1 and 2 are only schematic and are not taken as real information. In practice, the data contents and the sequence identification information in Tables 1 and 2 may be information in any possible form.

At S103, based on preset fields in a full audit data table, first audit data of the individual target activity data in individual fields and second audit data of the individual operation data in the individual fields are generated.

At S104, the first audit data and the second audit data in the individual fields are stored in the full audit data table, and the full audit data table is used in performing an audit.

Here, the full audit data table may include at least one preset field. In an embodiment of the present disclosure, verification information corresponding to the target activity data may be characterized by the first audit data in the individual fields, and verification information corresponding to the operation data may be characterized by the second audit data in the individual fields.

In a specific implementation, the fields in the full audit data table may include a sequence identification (JSN) field, a transaction type (Trantype) field, a digest (Digest) field, a user name (User Name) field (here denoted by User), a client signature (C-Sign) field, and an related sequence identification (R-JSN) field.

Among them, the user name in the user name field may characterize name, identification, and other information of a user who writes data to the full audit data table.

The client signature information in the client signature field may characterize signature information of the client for the target activity data or the operation data.

The sequence identification information in the sequence identification field may characterize an order in which individual data stored in the full audit data table are arranged. In an implementation, in the process of generating the first audit data of individual target activity data in the sequence identification field, the sequence identification information of the individual target activity data in the sequence identification field may be generated in a monotonically increasing manner, based on the order in which the individual target activity data are arranged. After performing the target transaction operation on individual target activity data, for the operation data corresponding to the individual target activity data, corresponding sequence identification information may be generated respectively, and then the operation data may be stored in the full audit data table in accordance with the sequence identification information. That is, in the full audit data table, all data may be stored in a monotonically increasing order in accordance with the sequence identification information.

A table structure of the full audit data table is shown in Table 3.

TABLE 3

| JSN | Digest | User | Trantype | C-Sign | R-JSN |
|---|---|---|---|---|---|
| 00000001 | Hash1 | User1 | I | Sign1 | JSN1 |
| 00000002 | Hash2 | User2 | D | Sign2 | JSN2 |
| 00000003 | Hash3 | User3 | H | Sign3 | JSN3 |

Table 3 includes a sequence identification (JSN) field, a digest (Digest) field, a user name (User Name) field, a transaction type (Trantype) field, a client signature (C-Sign) field, and a related sequence identification (R-JSN) field. As can be seen from Table 3, the sequence identification information JSN includes 00000001, 00000002, and 00000003, which means that multiple data are arranged in monotonically increasing order of sequence identification information. In addition, the digest information in the Digest field is a hash value Hash1, a hash value Hash2, a hash value Hash3, respectively; the user name information in the User Name field is User1, User2, User3, respectively; the transaction types in the Trantype field are data writing I, data purging D, data-be-hidden H, respectively; the client signature information in the C-Sign field is Sign1, Sign2, Sign3, respectively; and the related sequence identification information in the R-JSN field is JSN1, JSN2, JSN3, respectively. Here, it should be noted that information in the individual fields in Table 3 is schematic only.

After generating the sequence identification information corresponding to the target activity data, the first activity data in the current record table and the second activity data in the history record table may be related to individual first audit data in the full audit data table, respectively. In an implementation, for individual target activity data, the sequence identification information corresponding to the target activity data may be stored in the implicit column in the record table in which the target activity data reside. That is, the sequence identification information in the implicit column in the record table in which the target activity data reside refers to the sequence identification information in its corresponding full audit data table, i.e., the sequence identification information in the implicit column in the record table in which the target activity data reside is in an anchoring relationship with the sequence identification information in its corresponding full audit data table. It can be understood here that the target activity data corresponding to the sequence identification information in the current record table or the history record table as well as the audit data corresponding to the sequence identification information in the corresponding full audit data table correspond to the same transaction. For example, the target activity data corresponding to the sequence identification information 00000001 in the current record table as well as the audit data corresponding to the sequence identification information 00000001 in the full audit data table correspond to the same transaction.

Wherein, individual transaction types in the transaction type field may characterize types of the target transaction operations performed on individual target activity data.

Here, the transaction types may include a data writing transaction, a data purging transaction, a data hiding transaction, a data-be-hidden transaction, and a temporal transaction.

Specifically, the data writing transaction may refer to a transaction operation that writes the target activity data to the full audit data table. Exemplarily, the data writing transaction may be denoted by "I".

The data purging transaction may refer to a transaction operation that performs data purging on the target activity data, which herein may refer to a transaction operation that performs data purging on the second activity data in the history record table. Exemplarily, the data purging transaction may be denoted by "D".

The data hiding transaction may refer to a transaction operation that hides data, which herein may refer to a transaction operation that perform data hiding on the first activity data in the current record table or the second activity data in the history record table. Exemplarily, the data hiding transaction may be denoted by "U".

The data-be-hidden transaction may refer to a transaction operation itself, in which data are hidden. Exemplarily, the data-be-hidden transaction may be denoted by "H". In an implementation, in a case where the generated first audit data of individual target activity data in the transaction type field include data writing ("I"), after a data hiding transaction is performed on the target activity data, i.e., when the transaction type is data hiding, data writing ("I") of the operation data corresponding to the target activity data in the transaction type field may be updated to data-be-hidden ("H").

A temporal transaction may refer to a transaction operation that performs signing on the generated digest information using a timestamp from a trusted time service center. Exemplarily, a temporal transaction may be denoted by "T".

The digest information for individual rows of target activity data in the current record table and the history record table may be recorded in the digest field.

Figure 2:
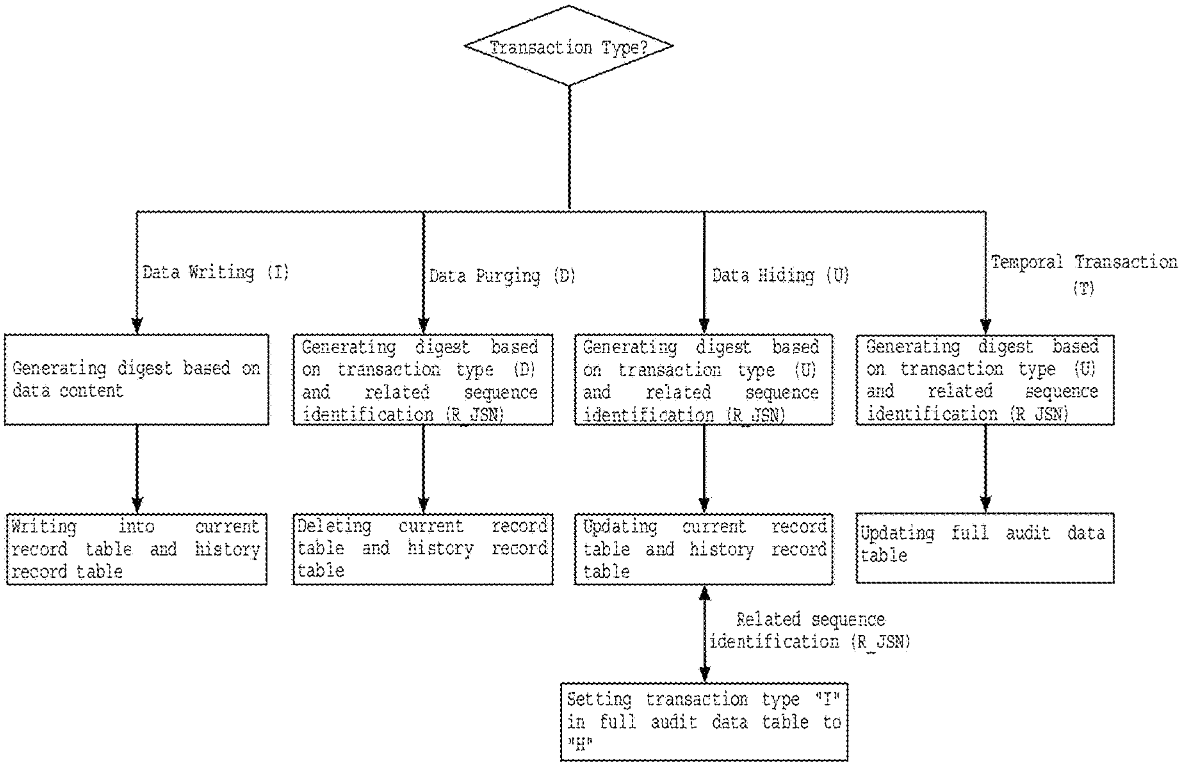
FIG. 2 illustrates a schematic diagram of a correspondence relationship between transaction types and ways of generating digests provided by an embodiment of the present disclosure.

In the full audit data table, the ways of generating digests may be different for different transaction types. FIG. 2 illustrates a correspondence relationship between the transaction types and the ways of generating digests.

Here, the transaction type is first determined. In a case where the transaction type is data writing, digest information of the target activity data in the transaction type field may be generated. That is, the generated first audit data include digest information in the transaction type field being data writing.

Specifically, in a case where the transaction type is data writing, as shown in FIG. 2, digest information of the target activity data in the digest field may be generated based on data contents of the target activity data, which herein may be denoted as Digest_of [C1, C2, C3]. Specifically, a hash calculation may be performed on individual data contents to obtain the digest information. Furthermore, the obtained digest information is written to the current record table or the history record table in which the target activity data reside.

In an implementation, after generating the digest information of the individual target activity data in the digest field, verification information corresponding to the digest information may be generated based on the digest information and a preset verification rule.

The verification information here may be a collection of information to be verified which is generated on a digest information tree. The verification information may be used to verify audit data corresponding to the current digest information as well as all audit data prior to the audit data. The verification information corresponding to the digest information may be stored in a verification information index table.

Then, based on the digest information, the verification information corresponding to the digest information, and client signature information, a target digest may be generated.

After signing the target digest, the signed target digest may be returned to the client.

In a case where the transaction type is another transaction type other than data writing, digest information of the operation data in the transaction type field may be generated. That is, the generated second audit data include digest information in the transaction type field being another transaction type other than data writing. Specifically, as shown in FIG. 2, for the data purging transaction type, the digest information may be generated based on the transaction type "D" and the corresponding related sequence identification information "R_JSN", which may be specifically denoted as Digest_of ['D', R_JSN], and the corresponding target activity data in the current record table and the history record table are deleted; for the data hiding transaction type, the digest information may be generated based on the transaction type "U" and the corresponding related sequence identification information "R_JSN", which may be specifically denoted as Digest_of ['U', R_JSN], and based on the target activity data after hiding, the current record table or the history record table in which the target activity data reside may be updated; and the current record table (or the history record table) may be related to the full audit data table using the related sequence identification information, and the transaction type in the full audit data table may be set from "I" to "H"; for the temporal transaction, the digest information may be generated based on the transaction type "T" and the corresponding related sequence identification information "R_JSN", which may be specifically denoted as Digest_of ['T', R_JSN], and the full audit data table is updated based on the generated digest information.

Specifically, for individual operation data, the sequence identification information of the target activity data corresponding to the operation data may be treated as the related sequence identification information of the operation data in the related sequence identification field; and then the transaction type information and the related sequence identification information of the operation data in the transaction type field may be hashed to obtain the digest information of the operation data in the digest field.

Here, the related sequence identification information in the related sequence identification field may characterize the sequence identification information used to relate the target activity data to the operation data.

The operation data are generated after performing a target transaction operation on the target activity data corresponding thereto, and therefore, in order to relate the operation data to the corresponding target activity data, here the sequence identification information of the target activity data corresponding thereto may be treated as the related sequence identification information of the operation data in the related sequence identification field. That is, by the related sequence identification information of the operation data in the related sequence identification field, the operation data may be related to the corresponding target activity data.

Here, the meaning indicated by the related sequence identification information in the related sequence identification field is related to the corresponding transaction type.

Specifically, when the transaction type is "T", the related sequence identification information may indicate that this value is from a temporal transaction anchoring. When the transaction type is "U", the related sequence identification information may indicate this value is a JSN value of the hidden target activity data. When the transaction type is "H", the related sequence identification information may indicate that this value is a JSN value of the data hiding transaction operation corresponding to the hidden target activity data. When the transaction type is "D", the related sequence identification information may indicate that this value is a termination boundary value of the purged JSN. When the transaction type is "I", the value of the related sequence identification information is a null value, which is denoted as NULL.

Figure 3:
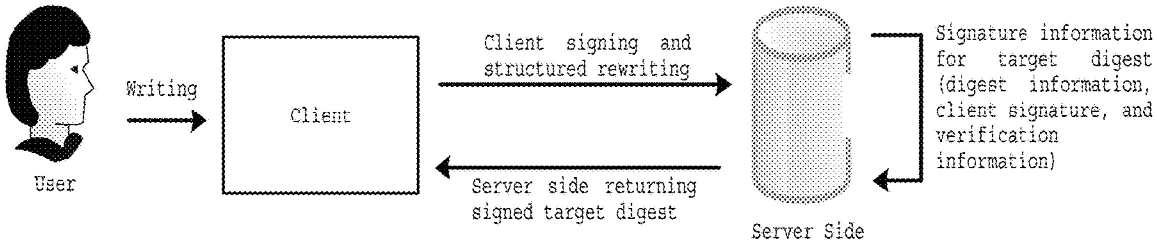
FIG. 3 illustrates a schematic diagram of a flow for writing target activity data to a full audit data table provided by an embodiment of the present disclosure.

A schematic diagram of a flow of writing the target activity data to the full audit data table is shown in FIG. 3. As shown in FIG. 3, first, a user writes the target activity data to the client; then, based on the target activity data to be written, monotonically increasing sequence identification information JSN values corresponding to the individual target activity data are generated, and the JSN values are written into the sequence identification field JSN of the full audit data table.

Next, for individual target activity data, based on the data contents of the target activity data, digest information of the target activity data in the digest field is generated, and the digest information of the individual target activity data is written into the digest field ("Digest") of the full audit data table.

Next, based on the digest information of the individual target activity data and a preset verification rule, verification information is generated. Then, the verification information is stored into the verification information index table.

Here, client signature information corresponding to the individual target activity data may also be acquired, and the client signature information is written into the client signature field ("C-Sign") of the full audit data table.

Then, based on the digest information, the verification information corresponding to the digest information, and the client signature information, a target digest "h" is generated.

Finally, the target digest "h" is signed by a server side and returned to the client.

In the above embodiment, with the first activity data in the first preset time period being stored in the current record table, when performing a read operation on the current record table, the operation on the history record table and the verification process for the full audit record table cannot be affected; and with the second activity data in the second preset time period being stored in the history record table, when performing a data purging operation on the history record table, the read/write operation on the current record table and the verification process for the full audit record table cannot be affected. With the first audit data and the second audit data being stored in the full audit data table, it can be ensured that the data in the full audit data table are full, and thus the completeness and correctness of the audit can be ensured. In addition, with the current record table, the history record table, and the full audit data table being generated, the embodiment of the present disclosure realizes and a reading-writing separation a reading-writing-verifying separation, and thus the audit efficiency can be improved.

It can be understood by those skilled in the art that in the above method of the detailed description, the written sequence of each step does not mean a strict execution sequence and does not constitute any limitation to the implementation process, and the specific execution sequence of each step should be determined based on its function and possible internal logic.

Based on the same inventive concept, an embodiment of the present disclosure also provides a data processing apparatus corresponding to the data processing method. Since the principle in solving the problem of the apparatus in the embodiment of the present disclosure is similar to the above data processing method in the embodiment of the present disclosure, the implementation of the apparatus can be referred to the implementation of the method, and redundant description thereof will be omitted.

Figure 4:
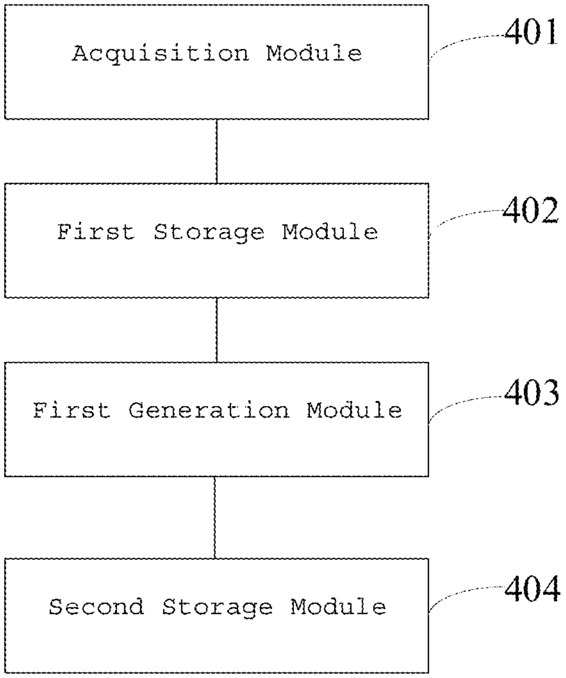
FIG. 4 illustrates a schematic diagram of a structure of a data processing apparatus provided by an embodiment of the present disclosure.

Referring to FIG. 4, a schematic diagram of a structure of a data processing apparatus provided by an embodiment of the present disclosure is shown. The apparatus includes an acquisition module 401, a first storage module 402, a first generation module 403, and a second storage module 404.

The acquisition module 401 is used to target activity data and operation data after a target transaction operation being performed on individual target activity data, the target activity data comprising first activity data in a first preset time period and second activity data in a second preset time period, the first preset time period being a time period closest to a current time, and the second preset time period being a time period prior to the first preset time period.

The first storage module 402 is used to store the first activity data in a current record table, and store the second activity data in a history record table.

The first generation module 403 is used to generate, based on preset fields in a full audit data table, first audit data of the individual target activity data in individual fields and second audit data of individual operation data in the individual fields.

The second storage module 404 is used to store the first audit data and the second audit data in the individual fields in the full audit data table, the full audit data table being used in performing an audit.

In an optional implementation, the fields includes a sequence identification field.

In performing the step of generating the first audit data of the individual target activity data in the fields, the first generation module 403 is specifically used to:

- generate, based on an order in which the individual target activity data are arranged, sequence identification information of the individual target activity data in the sequence identification field in a monotonically increasing manner.

In an optional implementation, after generating the sequence identification information of the individual target activity data in the sequence identification field, the apparatus further comprises:

- a third storage module used to, for the individual target activity data, store the sequence identification information corresponding to the target activity data in a record table in which the target activity data reside.

In an optional implementation, the fields comprise a transaction type field, and a transaction type is used to characterize a type of the target transaction operation performed on the individual target activity data.

In an optional implementation, the fields further comprise a digest field; the generated first audit data comprise digest information in the transaction type field which is data writing.

In performing the step of generating the first audit data of the individual target activity data in the individual fields, the first generation module 403 is specifically used to:

- for the individual target activity data, generate, based on data contents of the target activity data, digest information of the target activity data in the digest field.

In an optional implementation, after generating the digest information of the individual target activity data in the digest field, the apparatus further comprises:

- a second generation module used to generate, based on the digest information and a preset verification rule, verification information corresponding to the digest information;
- a third generation module used to generate a target digest based on the digest information, the verification information corresponding to the digest information, and client signature information; and
- a return module used to sign the target digest and return the signed target digest to a client which sends the target activity data.

In an optional embodiment, the fields further comprise a digest field and a related sequence identification field; the generated second audit data comprise digest information in the transaction type field which is another transaction type field other than the data writing.

In performing the step of generating the second audit data of the individual operation data in the individual fields, the first generation module 403 is specifically used to:

for the individual operation data, treat sequence identification information of the target activity data corresponding to the operation data as related sequence identification information of the operation data in the related sequence identification field; and hash transaction type information of the operation data in the transaction type field and the related sequence identification information, to obtain the digest information of the operation data in the digest field.

In an optional embodiment, the transaction type comprises data hiding; the generated first audit data of the individual target activity data in the transaction type field comprise data writing.

In performing the step of generating the second audit data of the individual operation data in the individual fields, the first generation module 403 is specifically used to:

update the data writing of the operation data corresponding to the target activity data in the transaction type field to data-be-hidden.

The description of the processing flow of individual modules in the apparatus and the interaction flow between individual modules may be referred to the relevant description in the above method embodiment, and will not be described in detail herein.

Figure 5:
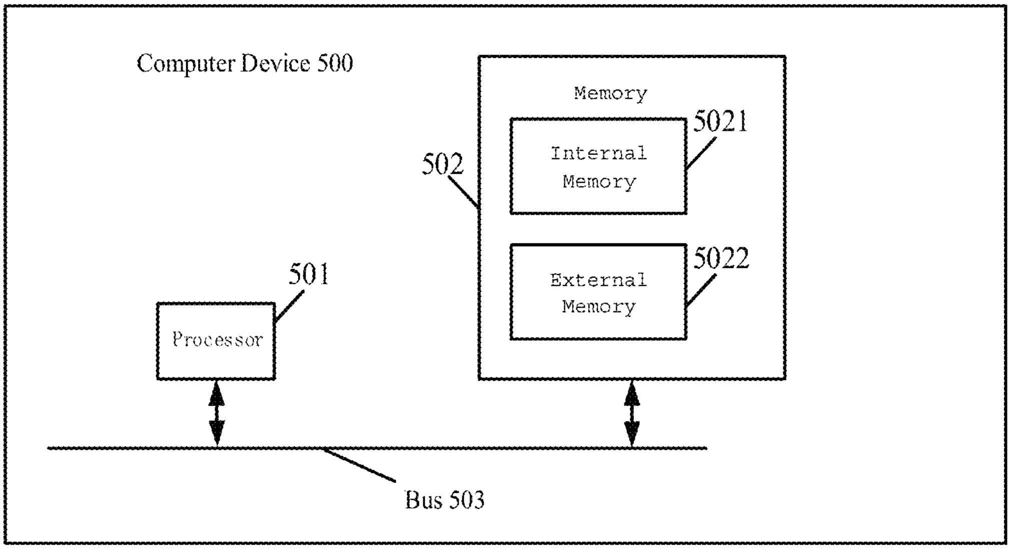
FIG. 5 illustrates a schematic diagram of a computer device provided by an embodiment of the present disclosure.

Based on the same technical idea, an embodiment of the present disclosure further provide a computer device. Referring to FIG. 5, a schematic diagram of a structure of a computer device 500 provided by the embodiment of the present disclosure is shown. The computer device 500 includes a processor 501, a memory 502, and a bus 503. Wherein, the memory 502 is used to store execution instructions, and includes an internal memory 5021 and an external memory 5022, and the internal memory 5021 herein is also called an internal storage and is used to temporarily store the operation data in the processor 501 and the data exchanged with the external memory 5022 such as a hard disk. The processor 501 exchanges data with the external memory 5022 via the internal memory 5021. When the computer device 500 is in operation, the processor 501 communicates with the memory 502 via the bus 503, so that the processor 501 executes the following instructions for:

acquiring target activity data and operation data after a target transaction operation being performed on individual target activity data, the target activity data comprising first activity data in a first preset time period and second activity data in a second preset time period, the first preset time period being a time period closest to a current time, and the second preset time period being a time period prior to the first preset time period;

storing the first activity data in a current record table, and storing the second activity data in a history record table;

generating, based on preset fields in a full audit data table, first audit data of the individual target activity data in individual fields and second audit data of individual operation data in the individual fields; and storing the first audit data and the second audit data in the individual fields in the full audit data table, the full audit data table being used in performing an audit.

An embodiment of the present disclosure further provides a computer-readable storage medium, the computer-readable storage medium has stored a computer program thereon, and when the computer program is executed by a processor, the steps of the data processing method described in the above method embodiment are executed. The storage medium may be a volatile or non-volatile computer-readable storage medium.

An embodiment of the present disclosure further provides a computer program product, the computer program product carries program codes, and the instructions included in the program codes can be used to perform the steps of the data processing method described in the above method embodiment. Details can be referred to the above method embodiment, and will not be described in further detail herein.

The above computer program product can be specifically implemented by hardware, software or a combination thereof. In an optional implementation, the computer program product is specifically embodied as a computer storage medium, and in another optional implementation, the computer program product is specifically embodied as a software product, such as a Software Development Kit (SDK) and the like.

It could be clearly understood by those skilled in the art that, for convenience and brevity of description, the specific working process of the system and the apparatus described above can be referred to corresponding process in the foregoing method embodiment, and will not be described in further detail herein. In the several embodiments provided in the present disclosure, it should be understood that the disclosed system, apparatus and method can be implemented in other ways. The apparatus embodiment described above are only illustrative. For example, the division of the units is only a logical function division. In actual implementation, there may be other divisions. For example, a plurality of units or components may be combined or may be integrated into another system, or some features can be ignored, or not implemented. In addition, the coupling or direct coupling or communication connection between each other shown or discussed components may be via some communication interfaces, and the indirect coupling or communication connection of the apparatuses or units may be in electrical, mechanical or other forms.

The units described as separate components may or may not be physically separated, and the components shown as units may or may not be physical units, that is, they may be located in one place, or they may be distributed over a plurality of network units. Some or all of the units may be selected to achieve the objects of the solution in the present embodiment according to actual needs.

Furthermore, individual functional units in various embodiments of the present disclosure may be integrated into one processing unit, or each unit may exist physically alone, or two or more units may be integrated into one unit.

If the functions are implemented in a form of software functional units and sold or used as independent products, they can be stored in a non-volatile computer-readable storage medium that is executable by a processor. On the basis of such understanding, the technical solution of the present disclosure is essentially embodied in the form of a software product, or the part that contributes to the prior art or a part of the technical solution can be embodied in the form of a software product. The computer software product is stored in a storage medium, including several instructions for causing an electronic device (which may be a personal computer, a server, or a network device, etc.) to perform all or a part of steps of methods described in various embodiments of the present disclosure. The foregoing storage medium comprises various media that can store program codes, such as USB disk, mobile hard disk, Read-Only Memory (ROM), Random Access Memory (RAM), magnetic disk or optical disk.

Finally, it should be noted that, the above embodiments are only specific embodiments of the present disclosure used to illustrate the technical solutions of the present disclosure and not to limit thereto, and the protection scope of the present disclosure is not limited thereto. Although the present disclosure has been described in detail with reference to the foregoing embodiments, it should be understood by those of ordinary skill in the art that, any technician familiar with the present technical field, within the technical scope disclosed in the present disclosure, can still modify the technical solutions recited in the foregoing embodiments or easily conceive changes thereof, or make equivalent substitutions for some of the technical features, and these modifications, changes or substitutions do not cause the essence of the corresponding technical solutions to deviate from the spirit and scope of the technical solutions of the embodiments of the present disclosure, and they should all be covered in the protection scope of the present disclosure. Therefore, the protection scope of the present disclosure should be subject to the protection scope of the claims.

What is claimed is:

1. A method for auditing data in a blockchain which is performed by a computer device, comprising:

acquiring target activity data and operation data after a target transaction operation being performed on individual target activity data, the target activity data comprising first activity data in a first preset time period and second activity data in a second preset time period, the first preset time period being a time period closest to a current time, and the second preset time period being a time period prior to the first preset time period;

storing the first activity data in a current record table, and storing the second activity data in a history record table, wherein the first activity data and the second activity data are stored in a blockchain;

generating, based on preset fields in a full audit data table, first audit data of the individual target activity data in individual fields and second audit data of individual operation data in the individual fields, wherein the fields comprise a transaction type field, the transaction type field is used to indicate a type of the target transaction operation performed on the individual target activity data, the target transaction operation comprises data hiding, the first audit data comprises data writing, and wherein the generating the second audit data of the individual operation data in the individual fields comprises: updating the data writing of the operation data corresponding to the target activity data in the transaction type field to data hiding;

storing the first audit data and the second audit data in the individual fields in the full audit data table; and auditing the first activity data and the second activity data stored in the blockchain using the full audit data table.

2. The method according to claim 1, wherein the fields further comprise a sequence identification field; and the generating the first audit data of the individual target activity data in the fields comprises:

generating, based on an order in which the individual target activity data are arranged, sequence identification information of the individual target activity data in the sequence identification field in a monotonically increasing manner.

3. The method according to claim 2, wherein after generating the sequence identification information of the individual target activity data in the sequence identification field, the method further comprises:

for the individual target activity data, storing the sequence identification information corresponding to the target activity data in a record table in which the target activity data reside.

4. The method according to claim 1, wherein the fields further comprise a digest field; the generated first audit data comprise digest information in the transaction type field which is data writing; and the generating the first audit data of the individual target activity data in the individual fields comprises:

for the individual target activity data, generating, based on data contents of the target activity data, digest information of the target activity data in the digest field.

5. The method according to claim 4, wherein after generating the digest information of the individual target activity data in the digest field, the method further comprises:

generating, based on the digest information and a preset verification rule, verification information corresponding to the digest information;

generating a target digest based on the digest information, the verification information corresponding to the digest information, and client signature information; and signing the target digest and returning the signed target digest to a client which sends the target activity data.

6. The method according to claim 1, wherein the fields further comprise a digest field and a related sequence identification field; the generated second audit data comprise digest information in the transaction type field which is another transaction type field other than the data writing; and the generating the second audit data of the individual operation data in the individual fields comprises:

for the individual operation data, treating sequence identification information of the target activity data corresponding to the operation data as related sequence identification information of the operation data in the related sequence identification field; and hashing transaction type information of the operation data in the transaction type field and the related sequence identification information, to obtain the digest information of the operation data in the digest field.

7. A computer device, comprising a processor, and a memory, the memory having machine-readable instructions executable by the processor stored thereon, wherein the machine-readable instructions are executed by the processor to implement a method for auditing data in a blockchain, the method comprising:

acquiring target activity data and operation data after a target transaction operation being performed on individual target activity data, the target activity data comprising first activity data in a first preset time period and second activity data in a second preset time period, the first preset time period being a time period closest to a current time, and the second preset time period being a time period prior to the first preset time period;

storing the first activity data in a current record table, and storing the second activity data in a history record table, wherein the first activity data and the second activity data are stored in a blockchain;

generating, based on preset fields in a full audit data table, first audit data of the individual target activity data in individual fields and second audit data of individual operation data in the individual fields, wherein the fields comprise a transaction type field, the transaction type field is used to indicate a type of the target transaction operation performed on the individual target activity data, the target transaction operation comprises data hiding, the first audit data comprises data writing, and wherein the generating the second audit data of the individual operation data in the individual fields comprises: updating the data writing of the operation data corresponding to the target activity data in the transaction type field to data hiding;

storing the first audit data and the second audit data in the individual fields in the full audit data table; and auditing the first activity data and the second activity data stored in the blockchain using the full audit data table.

8. The computer device according to claim 7, wherein the fields further comprise a sequence identification field; and the generating the first audit data of the individual target activity data in the fields comprises:

generating, based on an order in which the individual target activity data are arranged, sequence identification information of the individual target activity data in the sequence identification field in a monotonically increasing manner.

9. The computer device according to claim 7, wherein the fields further comprise a digest field; the generated first audit data comprise digest information in the transaction type field which is data writing; and the generating the first audit data of the individual target activity data in the individual fields comprises:

for the individual target activity data, generating, based on data contents of the target activity data, digest information of the target activity data in the digest field.

10. The computer device according to claim 7, wherein the fields further comprise a digest field and a related sequence identification field; the generated second audit data comprise digest information in the transaction type field which is another transaction type field other than the data writing; and the generating the second audit data of the individual operation data in the individual fields comprises:

for the individual operation data, treating sequence identification information of the target activity data corresponding to the operation data as related sequence identification information of the operation data in the related sequence identification field; and hashing transaction type information of the operation data in the transaction type field and the related sequence identification information, to obtain the digest information of the operation data in the digest field.

11. A non-transitory computer-readable storage medium, the computer-readable storage medium having a computer program stored thereon, wherein the computer program is executed by a processor of a computer device to implement a method for auditing data in a blockchain, the method comprising:

acquiring target activity data and operation data after a target transaction operation being performed on individual target activity data, the target activity data comprising first activity data in a first preset time period and second activity data in a second preset time period, the first preset time period being a time period closest to a current time, and the second preset time period being a time period prior to the first preset time period;

storing the first activity data in a current record table, and storing the second activity data in a history record table, wherein the first activity data and the second activity data are stored in a blockchain;

generating, based on preset fields in a full audit data table, first audit data of the individual target activity data in individual fields and second audit data of individual operation data in the individual fields, wherein the fields comprise a transaction type field, the transaction type field is used to indicate a type of the target transaction operation performed on the individual target activity data, the target transaction operation comprises data hiding, the first audit data comprises data writing, and wherein the generating the second audit data of the individual operation data in the individual fields comprises: updating the data writing of the operation data corresponding to the target activity data in the transaction type field to data hiding;

storing the first audit data and the second audit data in the individual fields in the full audit data table; and auditing the first activity data and the second activity data stored in the blockchain using the full audit data table.

12. The non-transitory computer-readable storage medium according to claim 11, wherein the fields further comprise a sequence identification field; and the generating the first audit data of the individual target activity data in the fields comprises:

generating, based on an order in which the individual target activity data are arranged, sequence identification information of the individual target activity data in the sequence identification field in a monotonically increasing manner.

13. The non-transitory computer-readable storage medium according to claim 11, wherein the fields further comprise a digest field; the generated first audit data comprise digest information in the transaction type field which is data writing; and the generating the first audit data of the individual target activity data in the individual fields comprises:

for the individual target activity data, generating, based on data contents of the target activity data, digest information of the target activity data in the digest field.

14. The non-transitory computer-readable storage medium according to claim 11, wherein the fields further comprise a digest field and a related sequence identification field; the generated second audit data comprise digest information in the transaction type field which is another transaction type field other than the data writing; and the generating the second audit data of the individual operation data in the individual fields comprises:

for the individual operation data, treating sequence identification information of the target activity data corresponding to the operation data as related sequence identification information of the operation data in the related sequence identification field; and hashing transaction type information of the operation data in the transaction type field and the related sequence identification information, to obtain the digest information of the operation data in the digest field.

* * * * *